Patented May 24, 1927.

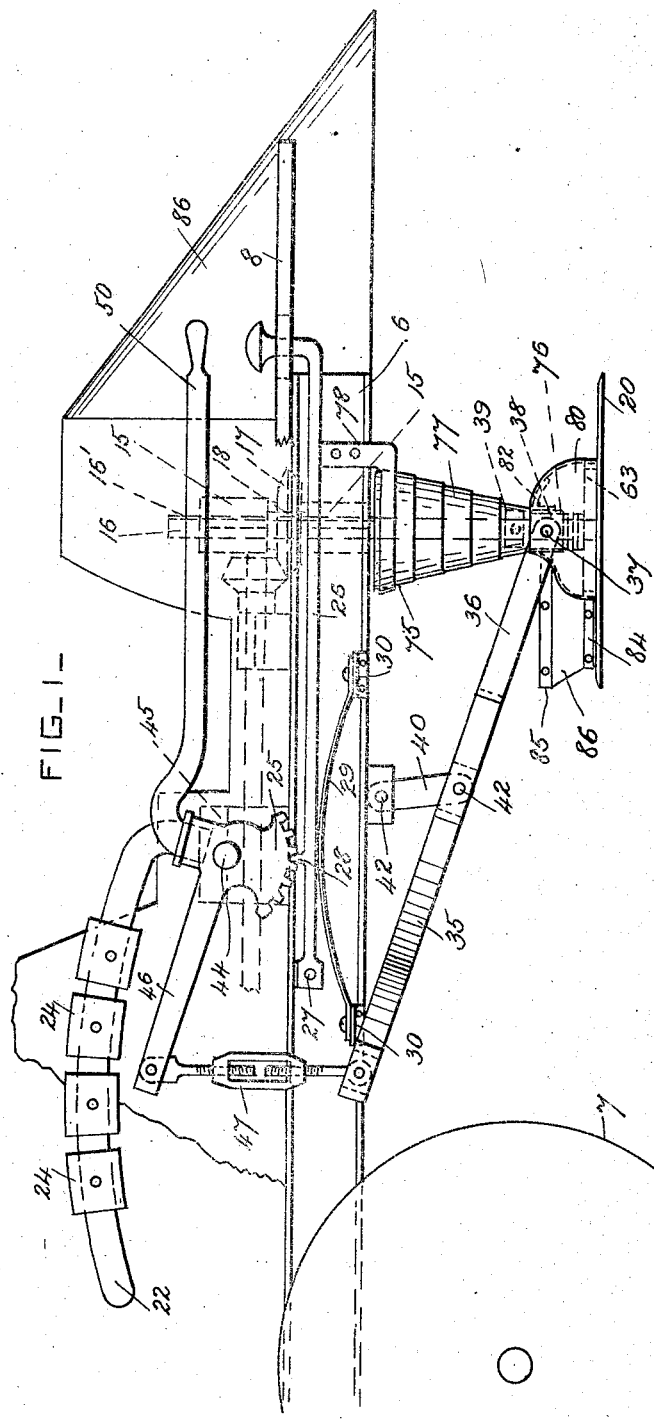

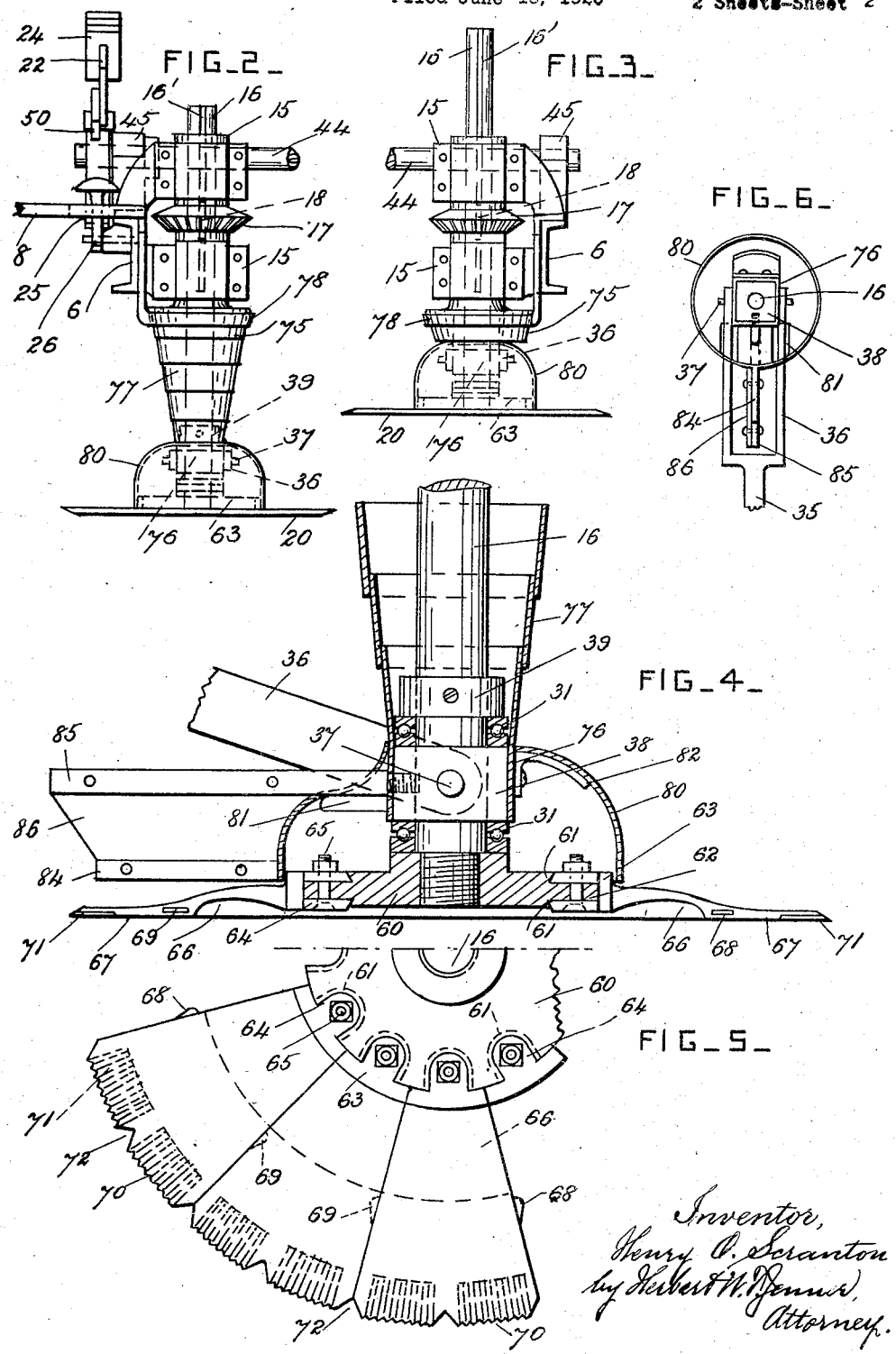

1,630,097

UNITED STATES PATENT OFFICE.

HENRY O. SCRANTON, OF JEANERETTE, LOUISIANA.

SUGAR-CANE HARVESTER.

Application filed June 19, 1925. Serial No. 38,191.

This invention relates to sugar cane harvesting machines of the sort for which Letters Patent were issued to me on April 22, 1924, No. 1,491,069; and it consists principally in certain improvements to the cutting mechanism, as hereinafter fully described and claimed, which enable the cutters to withstand the strains they are subjected to, and to be easily repaired when out of order, and which prevent weeds from winding around the cutters and their driving shafts.

In the drawings, Figure 1 is a side view of the cutting mechanism of a sugar cane harvester constructed according to this invention. Fig. 2 is a front view of one cutter and its supporting devices showing the cutter depressed. Fig. 3 is a similar view of the other cutter but showing it raised. Fig. 4 is a vertical section through one of the cutters and the lower part of the telescopic casing of its shaft, looking from one side as in Fig. 1, and drawn to a larger scale. Fig. 5 is a plan view from above of a portion of the cutter shown in Fig. 4. Fig. 6 is a plan view of the curved guard plates and cutter shaft, from below.

The general construction of the machine is similar to that described and shown in the said Patent No. 1,491,069. The frame 6 of the machine is mounted on front ground wheels 7, and in addition it has a platform 8 for the operator at its front end. Bearings 15 are secured in pairs to the frame at the sides of the machine, and vertical cutter shafts 16 are journaled in these bearings, and have longitudinal keyways 16'. Bevel gears 17 are arranged between the pairs of bearings, and have keys 18 secured in their hubs which are slidable in the keyways 16'.

The gears 17 are driven in opposite directions by any approved means as set forth in the said patent. Circular cutters 20 are secured on the shafts 16, and overlap each other at the center line of draft of the machine, and form a pair of circular shears.

The cutters 20 are raised and lowered simultaneously to adjust the height of cut above the ground by two similar levers 35, suspended from the frame by links 40 and pivot pins 42. The front ends of the levers are operatively connected with the shafts of the cutters substantially as described in the said patent, and their rear ends are connected to a rock-shaft 44 by means of similar arms 46 and links 47. The rock-shaft is journaled in bearings 45 on the frame, and extends across it. An operating lever 50 is also secured to the rock-shaft, and projects forwardly thereof instead of being arranged as shown in the said patent. The lever 50 is substantially horizontal, and it projects crosswise of the shafts 16 to a point in advance of them on the machine. This makes it convenient for the operator on the platform 8.

One or more counterbalance levers 22 are also secured to the rock-shaft 44, and are arranged at one or at both sides of the machine. Each lever 22 projects in the opposite direction from the hand lever 50, and has adjustable weights 24 secured on it. These weights are desirable to counterbalance the weight of the cutters 20, which according to this invention are made very strong and heavy. A toothed segment 25 is also secured to the rock-shaft 44, and 26 is a foot lever pivoted to the frame by a pin 27, and having a tooth 28 which engages with the toothed segment 25 and holds the cutters 20 at any desired height above the ground. A leaf spring 29 is mounted on brackets 30 secured to the frame, and normally holds the tooth 28 in engagement with the segment.

Large sugar canes requires strong and heavy cutters to harvest them, and in order to reduce the expense due to the breakage of cutters, instead of solid cutters as heretofore used, each cutter is formed of a series of segments. Each cutter shaft 16 is provided with antifriction thrust bearings 31 of approved construction, arranged above and below the block 38 to which the forked front end 36 of its lever 35 is pivoted by pins 37. A collar 39 is secured to the cutter shaft above the upper bearing 31.

A hub 60 is secured on the lower end portion of the cutter shaft 16, below the lower bearing 31, and has dovetailed sockets 61 in its upper and lower sides arranged in pairs and separated by webs 62. The sockets 61 are arranged radially of the shaft 16, and are spaced apart at equal distances. Each cutter section 62 has a curved shoulder 63 which bears on the periphery of the hub, and a forked member 64 which fits in the sockets 61 and straddles the web 62 between them. The ends of the curved shoulders project circumferentially beyond the forked members to which they pertain, and their top and bottom edges are arranged flush with the said members.

The forked members 64 and the webs 62 are secured together by bolts 65, and the shoulders 63 form a continuous annular projection around the hub, so that the cutter sections are firmly and rigidly secured, but may be removed and replaced with facility.

Each cutter section has a concave recess 66 in its underside, and a horizontal outer portion 67 beyond the recess arranged a little below the plane of the bottom of the hub. The sides of the cutter sections are radial of the cutter shaft, and at about the middle of their length they have interlocking tongues 68 and sockets 69, which hold their horizontal portions 67 securely in alinement. The tongues 68 are wedge-shaped, so that a portion of the sections can be removed and replaced without detaching them all from the hub. The bottoms of the two sockets 69 of each section are parallel to each other or are otherwise shaped so that each section can be slid radially independently of the other sections, it being only necessary for the tongues to fit against the tops and bottoms of the sockets.

The peripheries of the cutter sections have serrated cutting edges 70, and radial serrations 71 are formed in the undersides of the horizontal portions 67 which extend inwardly of their serrated cutting edges. The cutter sections also have large V-shaped serrations 72 at their junctions, and at one or more points between their junctions.

Cutters constructed in this manner will harvest the largest sugar canes with facility, and are not often broken, and they may be repaired in the field should a cutter section be accidentally injured or broken. The radial serrations shorten the stumps of the cut canes, so that the stumps do not press upwardly against the rear parts of the cutters after the concave clearance portions have passed over them.

Weeds and vines grow among the sugar canes, and cause much trouble and delay when they become wound around the cutters and cutter shafts as ordinarily constructed. According to this invention each cutter shaft is inclosed in a non-revoluble telescopic casing. This casing comprises an upper section 75, a bottom section 76, and a series of intermediate sections 77. The intermediate sections are slightly conical, and they slide telescopically together, as shown in Fig. 3, when the cutter shaft is raised. The top section 75 is secured to the frame by a bracket 78, and the bottom section is secured to the block 38.

A curved guard plate 80 is secured to the bottom section 76, and has slots 81 in it for the forked end portion 36 of the lever 35 to work in. The bottom edge of the guard plate overlaps the shoulders 63 on the cutter sections. The front and top of the guard plate is secured to the bottom section 76 by a bracket 82. A bar 85 is secured radially to the rear side of the bottom section 76, and a plate 86 is secured to the bar 85 and to an arm 84 on the rear side of the lower part of the guard plate. In this way the curved guard plate is rigidly secured to and supported by the bottom section 76 of the telescopic casing. The bar 85, plate 86 and arm 84 are the main support of the guard plate 80, and they operate to hold it securely in place and out of contact with the shoulders 63 on the cutter. The small bracket 82 assists in supporting the guard plate in place. The upper part of the bottom section 76 is conical to correspond with the intermediate sections 77, and when the cutter shaft is lowered, as shown in Fig. 2, the various sections fit neatly together.

As the telescopic casing sections and the guard plates do not revolve they do not wind up masses of vines and weeds as are wound up by exposed cutter shafts. A hood 86 is secured over the front parts of each cutter shaft and its driving mechanism above each telescopic casing.

What I claim is:

1. In a harvester, a supporting frame, a vertical driving shaft journaled in the frame and provided with a cutter, a pivoted lever for raising and lowering the cutter, a toothed segment pivoted to the frame and provided with a rearwardly projecting arm, means for connecting the said arm with the pivoted lever, an operating lever connected to the said segment and projecting forwardly of it, and a spring-controlled catch lever pivoted to the frame and provided with a tooth which normally engages with the said segment, the free end portions of the said levers being arranged conveniently adjacent to each other.

2. In a harvester, a supporting frame, two vertical driving shafts journaled in the frame and provided with circular cutters, two similar levers pivotally supported by the frame and operatively connected with the said shafts at one end, a rock-shaft mounted crosswise of the frame, means for connecting the rock-shaft with the other ends of the said levers, an operating lever secured to the rock-shaft, a toothed segment secured to the rock-shaft, a foot lever pivoted to the rear of the rock-shaft and projecting forwardly of it under the toothed segment and provided with a tooth, and a spring which normally holds the said tooth in engagement with the toothed segment.

3. In a harvester, a circular cutter comprising a hub and sector-shaped cutter sections detachably secured to the hub with their side edges arranged radially of it and provided with interlocking sockets and projecting tongues which permit the sections to be slid radially out of place when detached from the hub.

4. In a harvester, a circular cutter as set forth in claim 3, the said cutter sections having concave recesses in their undersides and outer portions which project below the level of the bottom of the hub and said outer portions having the said sockets and tongues formed in and on them.

5. In a harvester, a circular cutter comprising a hub having radial sockets in its upper and lower sides and having a web between each pair of sockets, detachable cutter sections provided with forked members which engage with the said sockets and straddle the webs between them, and means for securing the said forked members to the said webs.

6. In a harvester, a circular cutter as set forth in claim 5, the cutter sections having also curved shoulders which bear on the periphery of the hub and form an annular projection around it, the ends of the curved shoulders being arranged to project circumferentially beyond the forked members to which they pertain and their top and bottom edges being arranged flush with said members.

7. In a harvester, a circular cutter comprising a hub, and detachable cutter sections secured around the hub, each section having a concave recess in its underside and a horizontal outer portion which projects below the level of the bottom of the hub.

8. In a harvester, a circular cutter comprising a hub, and detachable cutter sections secured around the hub and provided with serrations at their peripheries and radial serrations in their undersides around their peripheries.

9. In a harvester, a circular cutter as set forth in claim 8, the said cutter sections having also V-shaped serrations at their joints and at intermediate points of their peripheries which are larger than the said serrations.

10. In a havester, a supporting frame, a vertical shaft journaled in the frame and provided with a circular cutter at its lower end, a non-revoluble telescopic casing inclosing the said shaft and attached to the said frame, and means for raising and lowering the said shaft and casing.

11. In a harvester, a combination of parts as set forth in claim 10, the said casing comprising a series of conical sections the top one of which is secured to the said frame.

12. In a harvester, a supporting frame, a vertical shaft journaled in the frame, a circular cutter secured on the lower part of the said shaft and provided with an annular projection on its upper side, a non-revoluble telescopic casing inclosing the said shaft, a curved guard plate secured to the lower part of the said casing and overlapping the annular projection on the cutter, and means for raising and lowering the said shaft and casing.

13. In a harvester, a revoluble driving shaft, a cutter secured thereon and having an annular projection, a non-revoluble casing inclosing the said shaft, a curved annular guard plate forming a continuation of the said casing and overlapping the said annular projection, and means for holding the said guard plate rigidly in place and out of contact with the said projection.

14. In a harvester, a revoluble driving shaft, a non-revoluble block operatively connected with the said shaft, a casing inclosing the said shaft, a cutter secured on the said shaft and having an annular projection, a curved annular guard plate forming a continuation of the said casing and overlapping the said projection and provided with slots, fastening devices rigidly securing the guard plate to the said block, and a lever for raising and lowering the driving shaft projecting through the said slots and pivoted to the said block.

In testimony whereof I have affixed my signature.

HENRY O. SCRANTON.